United States Patent
Ruvolo et al.

(10) Patent No.: US 7,440,910 B1
(45) Date of Patent: Oct. 21, 2008

(54) SYSTEM AND METHOD FOR RENEWING BUSINESS, PROFESSIONAL, AND PERSONAL CONTACTS

(75) Inventors: Joann Ruvolo, San Jose, CA (US); Stefan B. Edlund, Sunnyvale, CA (US); Daniel Alexander Ford, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 09/500,439

(22) Filed: Feb. 9, 2000

(51) Int. Cl.
  *G06Q 30/00* (2006.01)
  *G06Q 17/30* (2006.01)
(52) U.S. Cl. .......................................... 705/26; 705/27
(58) Field of Classification Search .................... 705/5, 705/9, 29, 32, 500, 26–27, 10–14; 345/335
See application file for complete search history.

(56) References Cited

U.S. PATENT DOCUMENTS 5,737,726 A * 4/1998 Cameron et al. ............... 705/7
5,831,611 A * 11/1998 Kennedy et al. ............ 345/763

OTHER PUBLICATIONS

Xcontact, http://web.archive.org/web/*/http://chez.com/svs/XcontactUS.html, Jan. 1, 1996.*

* cited by examiner

*Primary Examiner*—Jeffrey A. Smith
*Assistant Examiner*—Kalyan Deshpande
(74) *Attorney, Agent, or Firm*—IP Authority, LLC; Ramraj Soundararajan; Van Nguy

(57) ABSTRACT

A system and method for renewing business, professional and personal contacts is described. The system overcomes time and psychological hindrances to maintaining relationships by automatically selecting whom a user should keep in touch with by displaying this selection to the user. In an automatic mode, the system searches a contact list for candidates based on predetermined user preferences and a time-based algorithm (e.g. contact each week, month, 2 weeks after a meeting, etc.). Selected candidates are collected and images transferred to a display module to build a "keep in touch" section to be displayed to the user. In a manual mode, the user initiates the selection process.

34 Claims, 3 Drawing Sheets

SYSTEM AND METHOD FOR RENEWING BUSINESS, PROFESSIONAL, AND PERSONAL CONTACTS

BACKGROUND OF THE INVENTION

1. Field of Invention

The present invention relates to a system and method for renewing business, professional and personal contacts. More particularly, the present invention is related to a system and method for automatically selecting whom a user should keep in touch with and displaying such selections to the user.

2. Description of Prior Art

Remembering anniversaries, birthdays, meetings, bill-payment, special occasions or other important dates or events can become a large task when you have a busy schedule. Typically, people are in a constant state of catch up; there are always more demands than free time. Yet when there is free time, it gets idled away. One of the first things to get squeezed out of people's time is other people (e.g., business, professional and personal contacts). For example, people frequently fail to follow up on business accounts that went to their competitors. Or, when was the last time an individual saw colleagues from their university, acquaintances from prior year's conventions, friends from previous projects or jobs? Or, when was the last time the individual invited their neighbors over for dinner or followed up on a Christmas card?

From a professional, personal, and/or business stand point, the cost to an individual and their company is tremendous. An individual is most effective when they are connected or networked. Contacts that were previously made could be the source of new accounts, new sales, new job applicants, new ideas, the latest in research, joint projects, etc. The cost is also tremendous at a personal level, since their social net is what sustains and nurtures them.

A number of systems have been developed for maintaining and organizing communication with business contacts. For example, U.S. Pat. No. 5,831,611, issued to Kennedy, et al., discloses a process management system that includes a graphical process editor facilitating the creation of communication processes by a programmer on a graphical user interface. This patent presents relationships between the various conditionally executed events that are graphically represented to the programmer of the communication process while the programmer is creating or modifying the communication process. Events selection procedures conditionally direct the flow of execution by the process manager to one of the attached child events of the event selection procedures. In cases where processing the child event is conditioned upon the completion of the parent event, the child event may be delayed until the parent event is completed. However, this patent makes no mention of displaying a candidate's image to the user in order for the user to make contact, nor does it dynamically present possible contacts.

U.S. Pat. No. 5,737,726 issued to Cameron et al., discloses a contact management system that aids customer service representatives in providing service to customers in connection with products, information, and services. The management system stores customer relationship information and business events related to a customer. However, this patent is not used as a reminder service, nor does it display images of candidates to be contacted.

The prior art fails to provide an ongoing system and method for automatically selecting from a contact list whom a user should keep in touch with and display such selection(s) to the user. The user is presented with an image of a business associate, professional contact, and/or friend/family. Seeing that image reminds the user of how long it has been since they last met. The user then selects (e.g., clicks with a computer mouse) the image of the displayed candidate to make contact. Furthermore, the system dynamically presents possible contacts to the user. The prior art fails to include the above noted features as well as other benefits described, illustrated, and claimed hereafter.

Whatever the precise merits, features and advantages of the above cited references, none of them achieve or fulfills the purposes of the present invention. These and other objects are achieved by the detailed description that follows.

SUMMARY OF THE INVENTION

The present invention provides for a system and method for renewing business, professional and personal contacts. The system overcomes time and psychological hindrances to maintaining relationships by automatically selecting whom a user should keep in touch with by displaying such selection(s) to the user. The system comprises a user request, timer module, request processor, search/select module, user preferences, contact list, selected candidates, display module and a display (keep in touch). Furthermore, the system is initiated either manually, via the user request, or automatically, via the timer module. The system searches the contact list for candidates based on predetermined user preferences. In the automatic mode, the system searches the contact list for candidates based on a combination of predetermined user preferences and a time based algorithm. In either mode, selected candidates are transferred to a selected candidates list. A display module is used to build a "keep in touch" GUI to be displayed to the user and includes a visual display of a candidate's image (if available).

DESCRIPTION OF THE PREFERRED EMBODIMENTS

Figure 1:
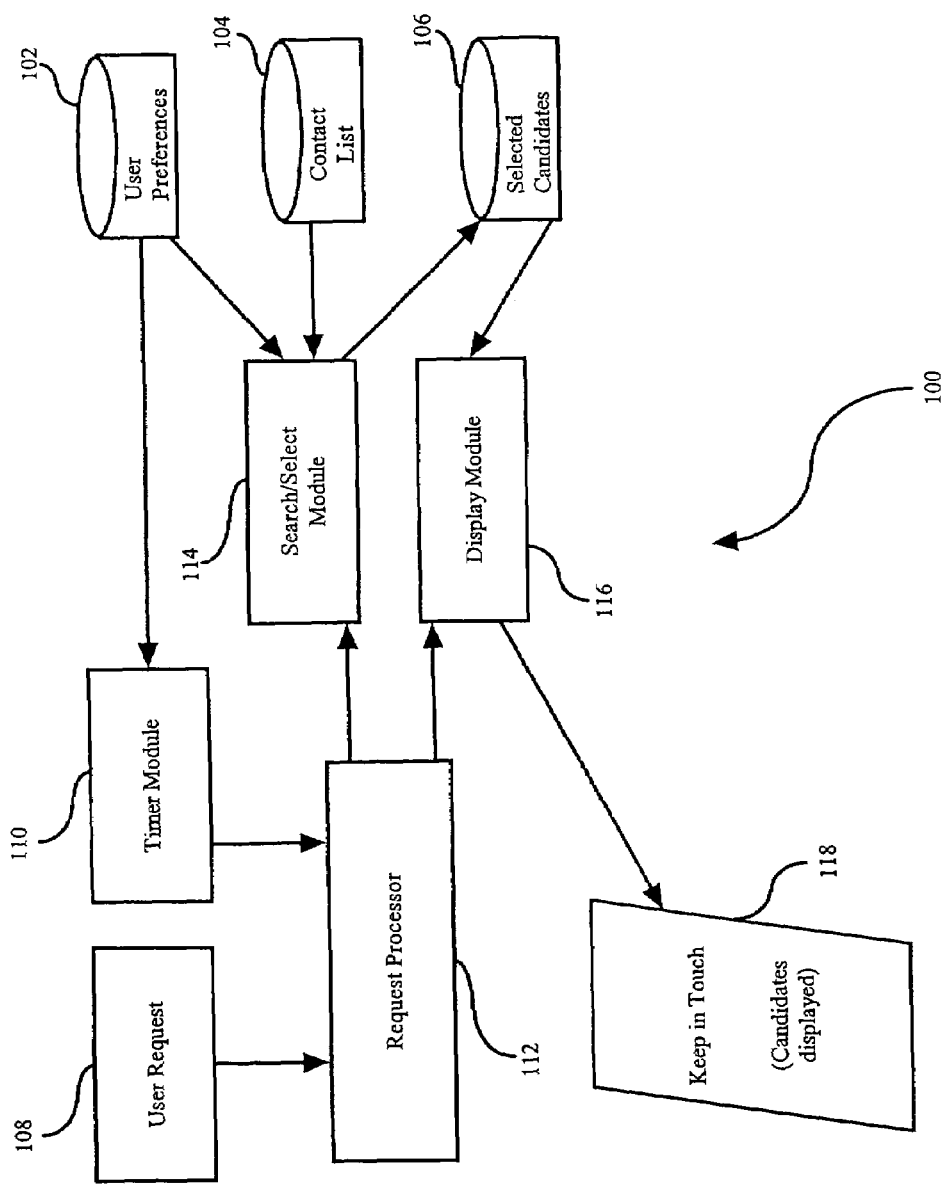
FIG. 1 illustrates an overview of the system architecture.

While this invention is illustrated and described in a preferred embodiment, the invention may be produced in many different configurations, forms and elements. There is depicted in the drawings, and will herein be described in detail, a preferred embodiment of the invention, with the understanding that the present disclosure is to be considered as an exemplification of the principles of the invention and is not intended to limit the invention to the embodiment illustrated. Those skilled in the art will envision may other possible variations within the scope of the present invention.

Referring now to the drawings, FIG. 1 illustrates a schematic overview of the invented system architecture 100 that provides as an output a suggested candidate to make contact with. The system is employed either manually, via user request 108, or automatically, via timer module 110. In the manual mode of operation, the user requests the system to select a possible candidate(s) from contact list 104. In the automatic mode of operation, a time reference (i.e., special dates such as birthdays, anniversaries, etc.), which is pre-stored in user preferences 102, initiates the selection cycle. A time reference includes such things as making contacts in a specified period (e.g., daily for business contacts, weekly for friends or monthly for family, etc.) or with a calendar function (e.g., two weeks from a previous meeting—i.e., follow-up).

With a calendar function, frequency can change if an individual is involved in certain activities, e.g., notify the individual every day with a contact when she/he is on vacation or notify the individual of a contact that she/he hasn't seen in the longest/shortest period of time. Upon reaching the time reference, the system automatically selects a possible candidate(s). Search/Select module 114 determines the specific candidates, including the number of candidates, to be selected from contact list 104 based on user preferences pre-stored in 102. Selections are based on various algorithms, some possible choices include:

Random Selection Algorithm. Determine the number of eligible contacts (e.g., all the contacts, just the personal ones, or just the professional ones). Use a random number generator to produce a number between 1 and the number of eligible contacts. Use this random number as an "index" into the eligible candidates. Do this up to the maximum number of candidates desired.

Time Algorithm. Select candidate based on time criteria—longest time since last contact, shortest time since last contact.

Remind Algorithm. Select candidate based on special dates such as birthdays and anniversaries.

Profitable Algorithm. Select candidate based on value criteria.

Note: algorithms can take into account these additional preferences:

Locale. Find contacts within a certain locale. For example, an individual lives in San Jose and is interested in local contacts. Or an individual will be visiting New York and is interested in contacts located in New York.

Activity. Frequency can change if individual is involved in certain activities. For example, notify the individual every day with a contact when he/she is on vacation.

Other algorithms could be used without departing from the scope of the present invention. A list of selected candidates is then stored in "Selected Candidates" 106, this information is then transferred to display module 116, which is used to build a "keep in touch" display 118 on user screen.

Contact list 104 contains information about possible contacts. Examples include, but are not limited to: name; organization; work address and phone numbers; home address and phone numbers; e-mail address; pager, and cellular numbers; image; personal or professional identifier; special dates such as birthdays and anniversaries; and contact dates such as scheduled meeting and last time met. The data can be organized as a database table, with one row for each contact, and with that row, a column for each attribute (e.g., name, organization, phone number). Or the contact list could reside in the file system, with one file for each contact or one file for all the contacts.

Note: value could be an additional field for a contact. This would indicate the value of the contact to your potential profitability—for example, a hot lead. Also personal or professional identifier could have a finer granularity (e.g., friends or family, close personal friend or social acquaintance).

User preferences 102 are setup by the user or by default settings. The user is asked if they would like to set preferences. The preferences include, but are not limited to, the following information: professional or personal contact; automatic or manual invocation; if automatic how often (time-based frequency of contact); select algorithm; maximum number of candidates to select; locale or activity. If the user decides to set preferences, then any preferred item from the contact list or combination thereof is considered in selecting a candidate/contact. If the user decides not to set preferences, then a set of default settings are considered. Possible defaults include, but are not limited to:

All contacts are eligible contacts
 Both automatic and manual invocation are allowed
 Frequency of a month
 Random Selection Algorithm
 Maximum number of candidates is 1
 No particular locale
 No change in frequency due to activity As previously discussed, the present invention allows either manual or automatic modes for selecting candidates. In an automatic mode, the user input time reference of frequency of contact is considered to cycle the automatic selection process. The cycle period, on one embodiment, is a predetermined time period of contacting a business associate or time elapsed since a previous meeting. An electronic calendering system, in one embodiment, can work in conjunction with the timer and search/select modules to provide data on previous and future meetings with contacts. With the aid of the search/select module 114, (full description provided below) a number of candidates to select is chosen. The steps taken in the selection process depend on the algorithm chosen. An example using the Time Algorithm with no preferences is as follows:

Find all contacts within the designated locale (e.g., San Jose) and create a result set.
 From the result set, find those contacts that are personal and create a new result set.
 Order the new result set based on time since last meeting.
 Select the maximum number of candidates with the longest time since last contact and add to the candidate list.

The selected candidates from the contact list are transferred to the selected candidates list 106 and then to display module 116 which is used to build keep in touch display 118 on screen 300. In a Web (WWW) embodiment, the display module could build the "keep in touch" section using HTML (Hypertext Markup Language). For each candidate selected:

Candidate record is accessed.
 Name and image from candidate record are retrieved.
 Name and image are added to the display format (e.g., HTML tags are created for the name and image for the "keep in touch" section; these tags are then added to the overall form).

After all the candidates are processed:

The GUI containing the "keep in touch" section is then displayed (e.g., the HTML tags are written to standard output).

If the user decides not to set preferences, reasonable predefined defaults, as described above, are provided by the system.

Figure 2:
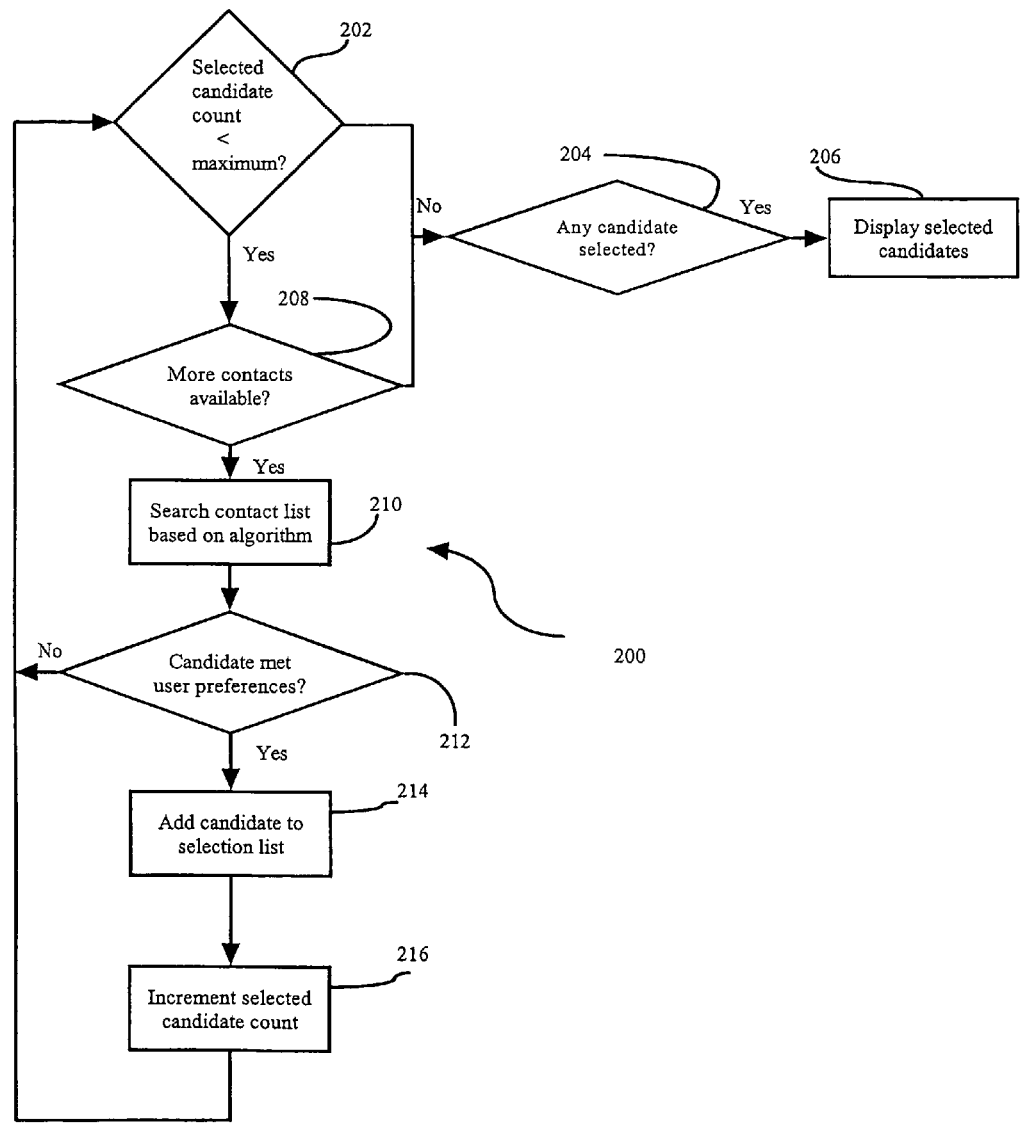
FIG. 2 illustrates a flow diagram for the select module.

Referring to FIG. 2, the basic selection algorithm first determines if a selected candidate count is less than a maximum, i.e., a count of the number of candidates to be output for display. If the count is not below a maximum and a candidate has been selected 204, then the image and other essential contact information, i.e., name are forwarded to the display. If the count is below the maximum, the selection process continues in a selection loop until all the candidates have been selected. The loop comprises: determining if more candidates are available 208 and searching the contact list based on a specified algorithm 210. If the candidate meets the user preferences 212, then the candidate is added to the selection list 214 and the count is incremented 216. If no candidate met the user preferences, the selection returns to the recognition of the count step 202.

Figure 3:
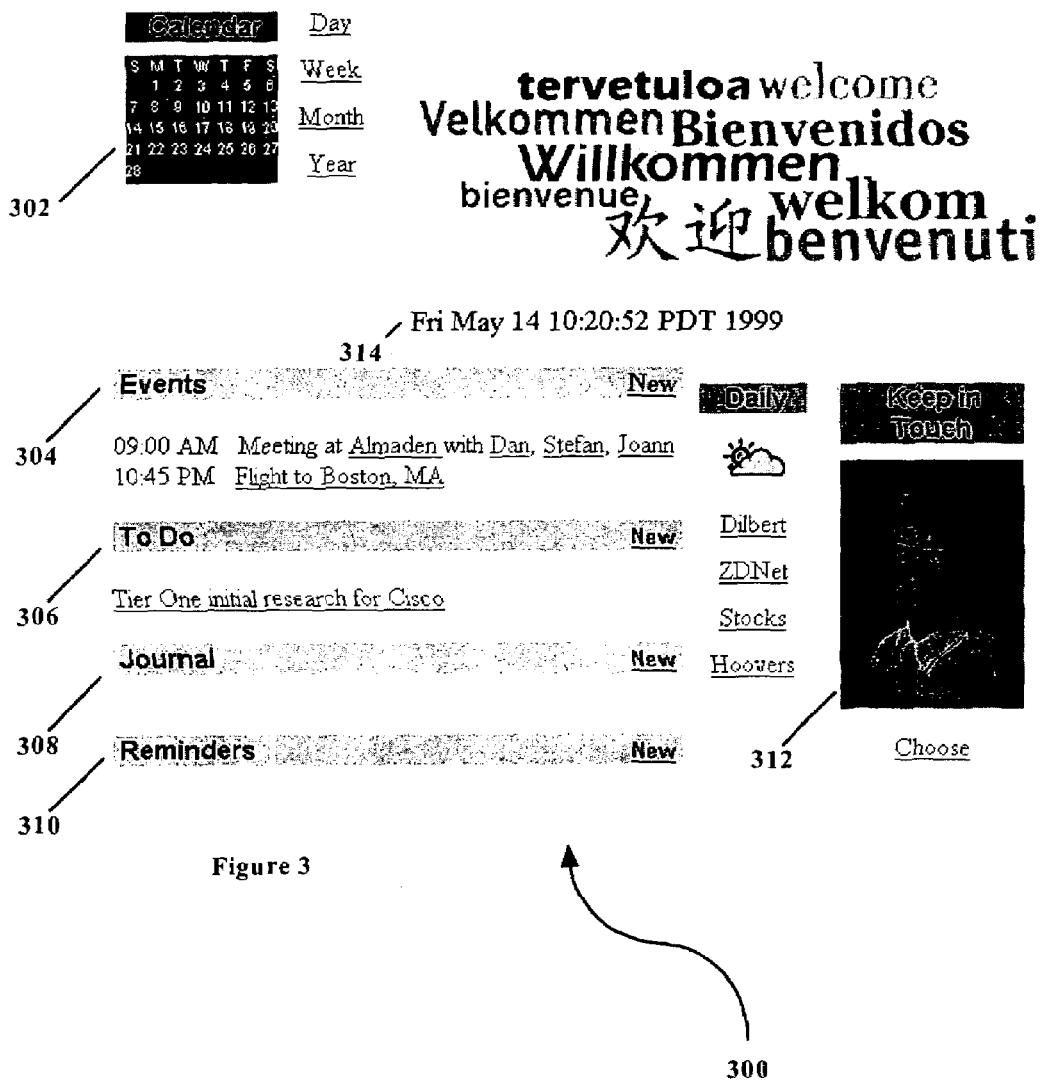
FIG. 3 illustrates a GUI of the present invention.

FIG. 3 illustrates a screenshot as might be found on a typical PC display. The display 300 includes various objects as typically found in an electronic organizer. The objects include, but are not limited to: a calendar function 302, date and time information 314, events 304 (such as meetings, flights, etc.), "to do" lists 306, a journal 308, and reminders 310. According to the present invention, an image of a selected candidate is displayed 312. In addition to the image, in alternative embodiments such information such as name, specifics of last meeting (e.g., date, location, other attendees, etc.) are displayed. The user selects the image to display the contact information and proceeds to make contact, i.e., arrange a meeting, e-mail, telephone, etc. In a Web (WWW) embodiment, a URL is associated with the image/name. In one embodiment, clicking on the URL would bring up a Web page containing the contact information. In another embodiment, making a selection would activate a URL, which triggers actions including, for example, e-mail.

The above described functional elements are implemented in various computing environments. For example, the present invention may be implemented on a conventional IBM PC or equivalent, multi-nodal system (e.g., LAN) or networking system (e.g., Internet, WWW). All programming, GUIs, display panels and dialog box templates, and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of general, graphics or object-oriented programming.

CONCLUSION

A system and method has been shown in the above embodiments for the effective implementation of renewing business, professional, and personal contacts. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware of specific algorithm. In addition, the specific chosen selection methods are representative of the preferred embodiment and should not limit the scope of the invention.

The invention claimed is:

1. A computer-based method of dynamically presenting potential contacts to a user comprising the following steps:
    retaining user preferences, wherein said user preferences comprise any of, or a combination of: professional or personal contacts, preference on initiating the searching step, time-based references, select algorithms, or maximum number of candidates to select;
    retaining a list of possible contacts, said list comprising at least identifying information and available images of said contacts;
    automatically initiating searching said list of possible contacts to select at least one potential contact based on said user preferences,
    retaining said at least one potential contact selected during said search, and
    displaying to the user an available image or other identifying information of said at least one potential contact identified during said automatic searching to automatically remind the user to stay in touch with said at least one potential contact.

2. A computer-based method of dynamically presenting potential contacts to a user, as per claim 1, wherein said user preferences comprise either preferences input by the user or pre-selected default preferences.

3. A computer-based method of dynamically presenting potential contacts to a user, as per claim 1, wherein said list of contacts further comprises any of: name, organization, work address, home address, telephone numbers, pager numbers, cellular numbers, e-mail address, personal or professional identifiers, special dates, and contact dates.

4. A computer-based method of dynamically presenting potential contacts to a user, as per claim 1, wherein said automatic searching step is initiated automatically by said time-based reference.

5. A computer-based method of dynamically presenting potential contacts to a user, as per claim 1, wherein said time-based references comprise any of: frequency of contact, time between contacts, or calendar-based contact.

6. A computer-based method of dynamically presenting potential contacts to a user, as per claim 4, wherein said automatic initiation of said searching step comprises: comparing applicable time-based references stored in said user preferences with a timer module, and upon a positive comparison, initiating said search step.

7. A computer-based method of dynamically presenting potential contacts to a user, as per claim 1, wherein said selection of a potential contact in said search step is either random or based on a select algorithm.

8. A computer-based method of dynamically presenting potential contacts to a user, as per claim 1, wherein said search step is repeated until said maximum number of candidates for selection has been achieved.

9. A computer-based method of dynamically presenting potential contacts to a user, as per claim 1, wherein said displaying step further comprises insertion of said available image or identifying information into a GUI.

10. A computer-based method of dynamically presenting potential contacts to a user, as per claim 9, wherein said GUI comprises an electronic organizer.

11. A computer-based method of dynamically presenting potential contacts to a user, as per claim 1, wherein said method may be implemented locally or remotely on one or more computer-based systems, across networks or existing communication mediums.

12. A computer-based method of dynamically presenting potential contacts to a user, as per claim 11, wherein said across networks element comprises any of LANs, WANs, cellular, Internet or Web-based networks.

13. A computer-based system for dynamically selecting possible contacts, said system comprising:
    user preferences stored in computer storage, wherein said user preferences comprise any of, or a combination of: professional or personal contacts, preference on initiating the searching step, time-based references, select algorithms, or maximum number of candidates to select;
    a contact list stored in computer storage, said contact list comprising at least identifying information and available images of said contacts;
    a manual request unit;
    a time-based request unit providing an invocation for time-based automatic initiation of searching;
    a display module;
    a search module, said search module determining the candidates to be selected;
    a request processor, said processor detecting an invocation output from said manual request unit or said time-based request unit and initiating said search module to select at least one potential candidate, and wherein said at least one potential candidate selected by said search module is stored in computer storage and processed to automatically remind a user to keep in communication with said at least one possible contacts by displaying, via said display module, said potential candidate's image or other identifying information.

14. A computer-based system for dynamically selecting possible contacts, as per claim 13, wherein said user preferences comprise either preferences input by the user or preselected default preferences.

15. A computer-based system for dynamically selecting possible contacts, as per claim 13, wherein said list of contacts further comprises any of: name, organization, work address, home address, telephone numbers, pager numbers, cellular numbers, e-mail address, personal or professional identifiers, special dates, and contact dates.

16. A computer-based system for dynamically selecting possible contacts, as per claim 13, wherein said time-based references comprise any of: frequency of contact, time between contacts, or calendar-based contact.

17. A computer-based system for dynamically selecting possible contacts, as per claim 13, wherein said automatic initiation of said selection by said search module comprises: comparing applicable time-based references stored in said user preferences with said timer module, and upon a positive comparison, initiating said search.

18. A computer-based system for dynamically selecting possible contacts, as per claim 13, wherein selection of a possible contact is either random or based on a select algorithm.

19. A computer-based system for dynamically selecting possible contacts, as per claim 13, wherein said one or more contacts are obtained by repeated execution of said search until said maximum number of candidates for selection has been achieved.

20. A computer-based system for dynamically selecting possible contacts, as per claim 13, wherein said displaying further comprises insertion of said available image or identifying information into a GUI.

21. A computer-based system for dynamically selecting possible contacts, as per claim 20, wherein said GUI comprises an electronic organizer.

22. A computer-based system for dynamically selecting possible contacts, as per claim 13, wherein said system may be implemented locally or remotely on one or more computer-based systems, across networks or existing communication mediums.

23. A computer-based system for dynamically selecting possible contacts, as per claim 22, wherein said across networks element comprises any of LANs, WANs, cellular, Internet or Web-based networks.

24. An article of manufacture comprising a computer media product implementing a process for selecting and presenting to a user possible candidates for contact comprising computer programmable code implementing:

retaining default or user selected preferences, wherein said user preferences comprise any of: professional or personal contacts, preference on initiating the searching step, time-based references, select algorithms, and maximum number of candidates to select;

retrieving a list of possible contacts; said list comprising at least identifying information and available images of said contacts;

selecting a number of possible candidates to be presented;

identifying a specific method of possible candidate selection;

automatically initiating a search for one or more possible candidates based on said user preferences, available candidates and method of selection, and wherein said one or more candidates identified based on said automatically initiated search are presented visually to automatically remind the user to stay in contact with said one or more identified contacts.

25. An article of manufacture comprising a computer media product implementing a process for selecting and presenting to a user possible candidates for contact, as per claim 24, wherein said list of contacts further comprises any of: name, organization, work address, home address, telephone numbers, pager numbers, cellular numbers, e-mail address, personal or professional identifiers, special dates, and contact dates.

26. An article of manufacture comprising a computer media product implementing a process for selecting and presenting to a user possible candidates for contact, as per claim 24, wherein said automatically initiating a search is based on a time-based reference in the user preferences.

27. An article of manufacture comprising a computer media product implementing a process for selecting and presenting to a user possible candidates for contact, as per claim 26, wherein said time-based reference comprises any of: frequency of contact, time between contacts or calendar-based contact.

28. An article of manufacture comprising a computer media product implementing a process for selecting and presenting to a user possible candidates for contact, as per claim 26, wherein said automatically initiating a search comprises: comparing applicable time-based references stored in said user preferences with a time function, and upon a positive comparison, initiating said search.

29. An article of manufacture comprising a computer media product implementing a process for selecting and presenting to a user possible candidates for contact, as per claim 24, wherein said selection of a possible contact in said search step is either random or based on a selected algorithm.

30. An article of manufacture comprising a computer media product implementing a process for selecting and presenting to a user possible candidates for contact, as per claim 24, wherein said search step is repeated until a maximum number of candidates for selection has been achieved.

31. An article of manufacture comprising a computer media product implementing a process for selecting and presenting to a user possible candidates for contact, as per claim 24, wherein said presenting visually to the user step further comprises insertion of said available image or identifying information into a GUI.

32. An article of manufacture comprising a computer media product implementing a process for selecting and presenting to a user possible candidates for contact, as per claim 31, wherein said GUI comprises an electronic organizer.

33. An article of manufacture comprising a computer media product implementing a process for selecting and presenting to a user possible candidates for contact, as per claim 24, wherein said process may be implemented locally or remotely on one or more computer-based systems, across networks or existing communication mediums.

34. An article of manufacture comprising a computer media product implementing a process for selecting and presenting to a user possible candidates for contact, as per claim 33, wherein said across networks element comprises any of LANs, WANs, cellular, Internet or Web-based networks.

* * * * *